US012649231B2

(12) United States Patent
Fu et al.

(10) Patent No.: US 12,649,231 B2
(45) Date of Patent: Jun. 9, 2026

(54) ROBOTIC INTERACTION SIMULATION SYSTEM AND METHOD

(71) Applicant: Honda Motor Co., Ltd., Tokyo (JP)

(72) Inventors: Xiyu Fu, San Jose, CA (US); Rana Soltani Zarrin, Los Gatos, CA (US); Yuhan Hu, Santa Clara, CA (US)

(73) Assignee: Honda Motor Co., Ltd., Tokyo (JP)

( * ) Notice: Subject to any disclaimer, the term of this patent is extended or adjusted under 35 U.S.C. 154(b) by 69 days.

(21) Appl. No.: 18/919,869

(22) Filed: Oct. 18, 2024

(65) Prior Publication Data

US 2025/0345930 A1 Nov. 13, 2025

Related U.S. Application Data

(60) Provisional application No. 63/646,864, filed on May 13, 2024.

(51) Int. Cl.
*B25J 9/16* (2006.01)
*B25J 13/08* (2006.01)
*B25J 19/02* (2006.01)

(52) U.S. Cl.
CPC ............. *B25J 9/163* (2013.01); *B25J 9/1605* (2013.01); *B25J 13/084* (2013.01); *B25J 19/023* (2013.01)

(58) Field of Classification Search
CPC ........ B25J 9/163; B25J 9/1605; B25J 13/084; B25J 19/023; B25J 9/1671; B25J 9/161;

B25J 9/1653; B25J 9/1656; B25J 9/1661; B25J 9/1664; B25J 9/1669; B25J 9/1674; B25J 9/1679; B25J 11/0005; B25J 11/001; B25J 11/0015; B25J 11/009; B25J 13/003; B25J 19/026
See application file for complete search history.

(56) References Cited

U.S. PATENT DOCUMENTS

| | | | | |
|---|---|---|---|---|
| 10,898,999 | B1 * | 1/2021 | Cohen | B25J 9/0003 |
| 2019/0248004 | A1 * | 8/2019 | Nelson | G06N 5/04 |
| 2020/0016745 | A1 * | 1/2020 | Tang | B25J 11/0005 |
| 2021/0201139 | A1 * | 7/2021 | Basset | B25J 19/026 |
| 2022/0207426 | A1 * | 6/2022 | Scherer | G06F 18/2155 |

* cited by examiner

*Primary Examiner* — Esvinder Singh
(74) *Attorney, Agent, or Firm* — Rankin, Hill & Clark LLP

(57) ABSTRACT

A computer-implemented method of performing robotic simulation and design may include performing a simulation where a robot interacts with a user, and generating sensor data indicative of the robot interaction with the user during the simulation. The computer-implemented method may include generating discussion data indicative of user feedback from the simulation, generating form data associated with the user feedback from the simulation, and combining the sensor data, the discussion data, and the form data in a multimodal signal. The computer-implemented method may include determining a design characteristic of the robot based on the multimodal signal, and augmenting a robot model to incorporate the design characteristic using a machine learning algorithm.

20 Claims, 8 Drawing Sheets

200

400

402

404

410

| ID | code | ID | code | ID | code |
|---|---|---|---|---|---|
| 1 | safety perception | 16 | initial contact | 27 | setting/task variance |
| 2 | comfort | 17 | repeating gestures | 34 | sensitivity of body part |
| 3 | trust | 53 | approaching phase | 35 | tolerance |
| 4 | intuitiveness | 49 | contacting phase | 36 | body poses constrain |
| 5 | perceived robot capability | 18 | leaving phase | 37 | non-instrumental behaviors |
| 6 | efficiency | 20 | technical improvement | 38 | communication |
| 7 | task performance | 21 | continuous force application | 39 | transparency |
| 8 | user expectation | 22 | future hardware | 40 | social interaction |
| 9 | agency | 23 | robot adaptation | 41 | greetings |
| 10 | force | 24 | sensing | 42 | demographic |
| 11 | feedback | 54 | user input | 43 | robotic background |
| 12 | speed perception | 25 | personalization/generalization | 44 | between-iteration improvement |
| 52 | delay | 26 | autonomy | 45 | metaphor |
| 13 | waypoint location | 28 | material | 46 | perspective |
| 14 | location mismatch | 29 | add-on-tool | 50 | learning effect |
| 51 | number of waypoints | 30 | softness | 55 | form factor |
| 48 | trajectory smoothness | 31 | friction | 47 | methodology paper |
| 15 | proximity | 32 | contact area | | |
| 19 | correlated parameters | 33 | hand pose | | |

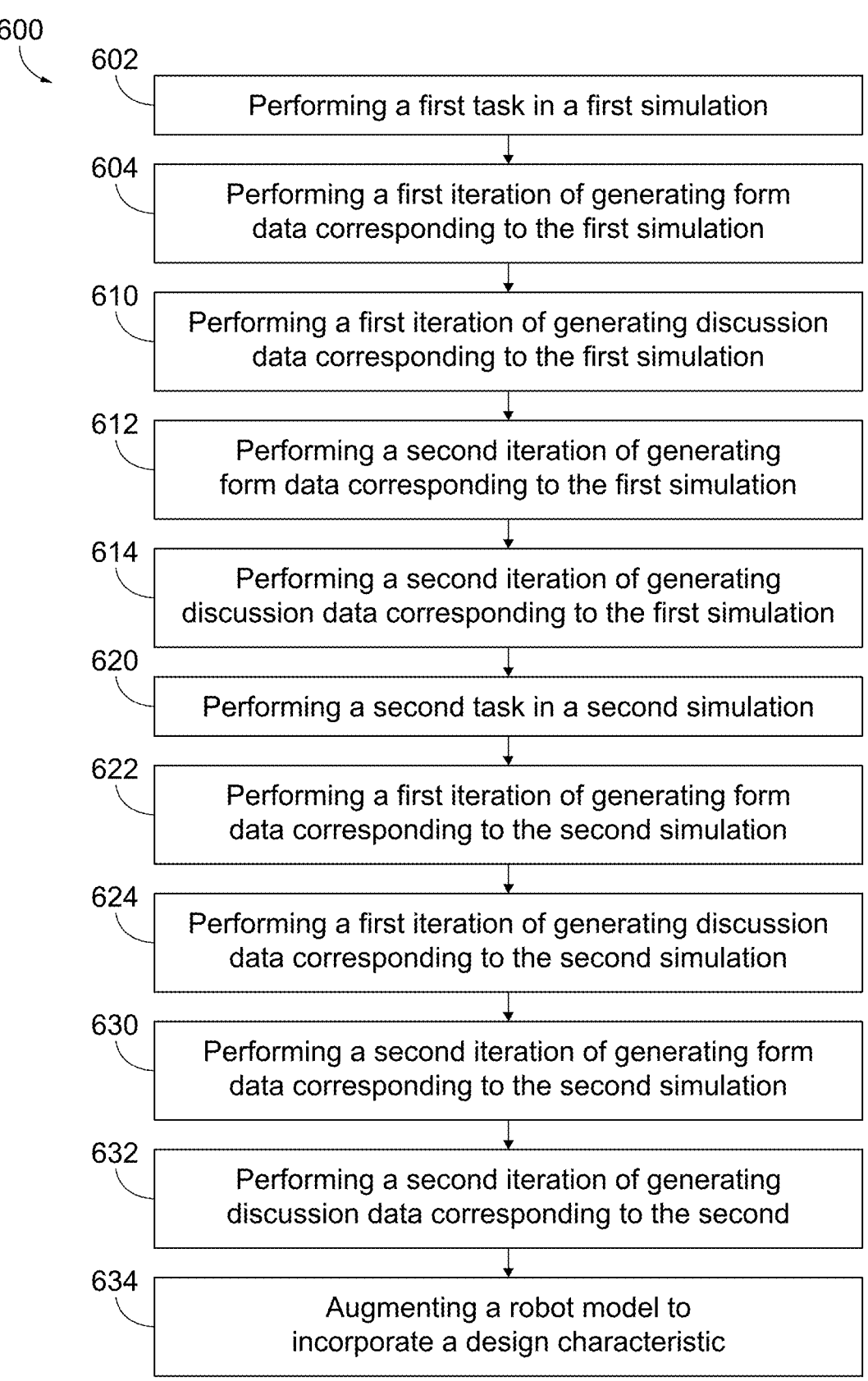

602 — Performing a first task in a first simulation

604 — Performing a first iteration of generating form data corresponding to the first simulation 610 — Performing a first iteration of generating discussion data corresponding to the first simulation 612 — Performing a second iteration of generating form data corresponding to the first simulation 614 — Performing a second iteration of generating discussion data corresponding to the first simulation 620 — Performing a second task in a second simulation 622 — Performing a first iteration of generating form data corresponding to the second simulation 624 — Performing a first iteration of generating discussion data corresponding to the second simulation 630 — Performing a second iteration of generating form data corresponding to the second simulation 632 — Performing a second iteration of generating discussion data corresponding to the second 634 — Augmenting a robot model to incorporate a design characteristic

FIG. 6

ROBOTIC INTERACTION SIMULATION SYSTEM AND METHOD

CROSS-REFERENCE TO RELATED APPLICATIONS

This application claims the benefit of U.S. Provisional Patent Application, Ser. No. 63/646,864 entitled "ROBOT DESIGN", filed on May 13, 2024; the entirety of the above-noted application(s) is incorporated by reference herein.

BACKGROUND

Advancements in hardware and software that may be employed in robot technologies have widened existing fields of use and created new potential applications for specific design characteristics and implementation guidelines associated with robotic tasks. In many fields of use, such advancements in robot technologies has resulted in a transition from industrial applications to personal and service-oriented roles. Consequently, robots are increasingly integrated into various aspects of daily life including healthcare, education, entertainment, and domestic assistance. As robots become more prevalent in user-facing roles, there is an increased demand for the design and implementation of these robots to be meticulously tailored to facilitate effective and intuitive interaction with users.

Also, many user-oriented products and devices are conventionally designed through controlled studies involving a plurality of individual users, where each user generates information to be considered for determining a final design and implementation of the product. However, there are existing difficulties in efficiently and effectively generating and processing sufficient information for accurately determining ideal design characteristics or implementations associated with specific tasks through conventional methods. Notably, in this regard, determining the nuances of human experience in direct interactions between robots and users often requires processing numerous factors of design and implementation at a time, and processing such factors for a plurality of users at a same time to accurately determine ideal design characteristics or implementations for a broad group of users, even for specific tasks. Consequently, there is also demand for a design pipeline capable of determining design and implementation features for robots based on a plurality of controlled user interactions.

SUMMARY

According to one aspect, A computer-implemented method of performing robotic simulation and design may include performing a simulation where a robot interacts with a user, and generating sensor data indicative of the robot interaction with the user during the simulation. The computer-implemented method may include generating discussion data indicative of user feedback from the simulation, generating form data associated with the user feedback from the simulation, and combining the sensor data, the discussion data, and the form data in a multimodal signal. The computer-implemented method may include determining a design characteristic of the robot based on the multimodal signal, and augmenting a robot model to incorporate the design characteristic using a machine learning algorithm.

According to another aspect, a system for performing robotic simulation and design may include a robot that interacts with a user in a simulation, a sensor apparatus that generates sensor data indicative of the robot interaction with the user during the simulation, and at least one processor. The at least one processor generates discussion data indicative of user feedback from the simulation, generates form data associated with the user feedback from the simulation, and combines the sensor data, the discussion data, and the form data in a multimodal signal. The at least one processor also determines a design characteristic of the robot based on the multimodal signal, and augments a robot model to incorporate the design characteristic using a machine learning algorithm.

According to another aspect, a non-transitory computer readable storage medium stores instructions that, when executed by a computer having a processor, causes the processor to perform a method. The computer-implemented method may include performing a simulation where a robot interacts with a user, and generating sensor data indicative of the robot interaction with the user during the simulation. The computer-implemented method may include generating discussion data indicative of user feedback from the simulation, generating form data associated with the user feedback from the simulation, and combining the sensor data, the discussion data, and the form data in a multimodal signal. The computer-implemented method may include determining a design characteristic of the robot based on the multimodal signal, and augmenting a robot model to incorporate the design characteristic using a machine learning algorithm.

BRIEF DESCRIPTION OF THE DRAWINGS

FIG. 4 is a code book employed in generating discussion data based on the simulation including the robot and the user.

FIG. 6 is an exemplary iterative computer-implemented method executed by the system of FIG. 1.

DETAILED DESCRIPTION

Figure 1:
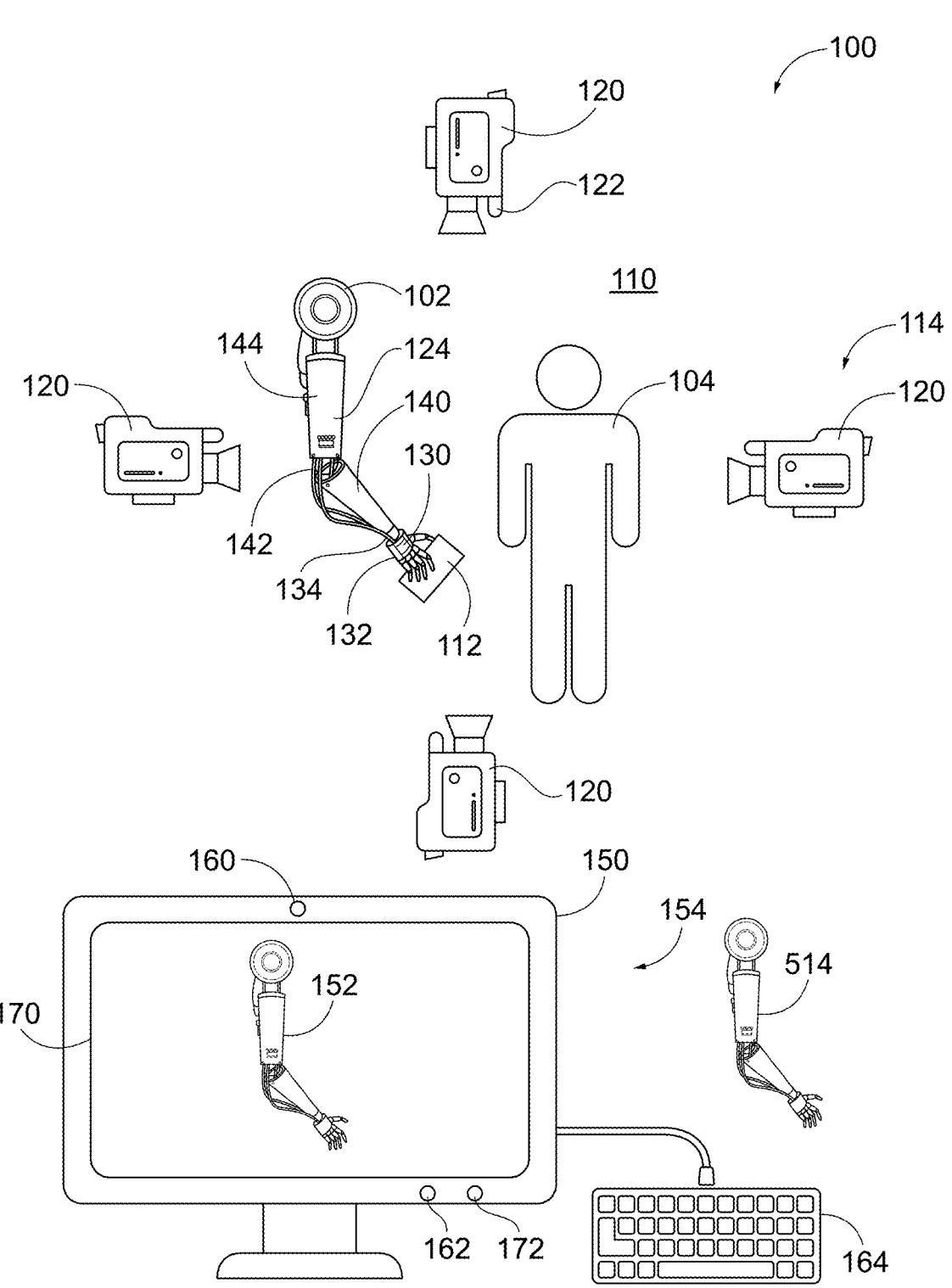
FIG. 1 is a diagram of an exemplary system for performing a simulation including a robot interacting with a user.

The systems and methods disclosed herein may perform a simulation where a robot interacts with a user to perform a task, determine affect values experienced by the user with respect to the robot during and after the simulation, and determine a design characteristic or implementation guideline associated with the robot performing the task. The described systems and methods may be performed in an iterative process that may include augmenting the robot or manufacturing a second robot to include the design characteristic or perform the implementation guideline.

Definitions

The following includes definitions of selected terms employed herein. The definitions include various examples and/or forms of components that fall within the scope of a term and that may be used for implementation. The examples are not intended to be limiting. Furthermore, the components discussed herein may be combined, omitted, or organized with other components or into different architectures.

"Bus", as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also interconnect with components inside a device using protocols such as Media Oriented Systems Transport (MOST), Controller Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between two or more communicating devices (e.g., computer, personal digital assistant, cellular telephone, network device, vehicle, connected thermometer, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), among others.

Computer communication may utilize any type of wired, wireless, or network communication protocol including, but not limited to, Ethernet (e.g., IEEE 802.3), Wi-Fi (e.g., IEEE 802.11), communications access for land mobiles (CALM), WiMAX, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE, CAT-M, LoRa), satellite, dedicated short range communication (DSRC), among others.

"Communication interface" as used herein may include input and/or output devices for receiving input and/or devices for outputting data. The input and/or output may be for controlling different features, components, and systems. Specifically, the term "input device" includes, but is not limited to keyboard, microphones, pointing and selection devices, cameras, imaging devices, video cards, displays, push buttons, rotary knobs, and the like. The term "input device" may include graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database", as used herein, is used to refer to a table. In other examples, "database" may be used to refer to a set of tables. In still other examples, "database" may refer to a set of data stores and methods for accessing and/or manipulating those data stores. According to one aspect, a database may be stored, for example, at a disk, data store, and/or a memory. A database may be stored locally or remotely and accessed via a network.

"Data store", as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "disk" or "drive", as used herein, may be a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

"Display", as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device or mobility device.

"Memory", as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection", or a connection by which entities are "operably connected", is one in which signals, physical communications, and/or logical communications may be sent and/or received. An operable connection may include a wireless interface, firmware interface, a physical interface, a data interface, and/or an electrical interface.

"Portable device" or "mobile device" as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. According to one aspect, a "portable device" could refer to a remote device that may include a processor for computing and/or a communication interface for receiving and transmitting data remotely.

"Processor", as used herein, processes signals and performs general computing and arithmetic functions. Signals processed by the processor may include digital signals, data signals, computer instructions, processor instructions, messages, a bit, a bit stream, which may be received, transmitted, and/or detected. Generally, the processor may be a variety of various processors including multiple single and multicore processors and co-processors and other multiple single and multicore processor and co-processor architectures. The processor may include logic circuitry to execute actions and/or algorithms. The processor may also include any number of modules for performing instructions, tasks, or executables.

A "robot", as used herein, may be a machine, such as one programmable by a computer, and capable of carrying out a complex series of actions automatically. A robot may be guided by an external control device, or the control may be embedded within a controller. A robot may be designed to perform a task with no regard to appearance. Therefore, a 'robot' may include a machine which does not necessarily resemble a human, including a vehicle, a device, a flying robot, a manipulator, a robotic arm, etc.

"User" as used herein may be a biological being, such as humans (e.g., adults, children, infants, etc.).

A "wearable computing device", as used herein may include, but is not limited to, a computing device (e.g., a processor) with circuitry that may be worn or attached to a user. In other words, a wearable computing device is a computer that is subsumed into the personal space of a user. Wearable computing devices may include a display and may include various sensors for sensing and determining various parameters of a user. For example, location, motion, and physiological parameters, among others. Exemplary wearable computing devices may include, but are not limited to, watches, glasses, clothing, gloves, hats, shirts, jewelry, rings, earrings necklaces, armbands, leashes, collars, shoes, earbuds, headphones, and personal wellness devices.

System Overview

Referring now to the drawings, the drawings are for purposes of illustrating one or more exemplary aspects and not for purposes of limiting the same. FIG. 1 depicts a system 100 for performing, recording, and processing a simulation including a robot 102 and a user 104 in a simulation environment 110. During the simulation, the robot 102 interacts with the user 104 in the simulation environment 110 to perform a task. The robot 102 may perform the task using an object 112.

In the depicted aspect, the object 112 is a sponge for cleaning the user 104, and the task may include wiping the user 104 with the object 112 for cleaning the user 104. The robot 102 may perform a variety of tasks that include contact with the user 104 in the simulation, with or without using the object 112. Also, the object 112 may be any of a variety of tools associated with performing the task in the simulation without departing from the scope of the present disclosure. For example, the object 112 may be medical gauze, and the task may include the robot 102 applying pressure to an area of the user 104 with the medical gauze or object 112.

The system 100 may include a sensor apparatus 114 that generates sensor data indicative of the robot 102 interactions with the user 104 during the simulation. In the depicted aspect, the sensor apparatus 114 includes four cameras 120 that capture image data and video data of the robot 102 interacting with the user 104 during the simulation as the sensor data. While, as depicted, the system 100 includes four cameras 120, the system 100 may include more or fewer of the cameras 120 angularly offset from each other without departing from the scope of the present disclosure.

Notably, as described in greater detail herein, a plurality of cameras angularly offset from each other in the simulation environment 110 may provide relatively encompassing, generalized training data for a machine learning algorithm. In this regard, according to one aspect, the sensor apparatus 114 may include at least two cameras 120 that each generate image data and video data as the sensor data, where the at least two cameras 120 are angularly offset from each other in the simulation environment 110.

Furthermore, each of the cameras 120 may include a combination of optical, infrared, other cameras, or image capture devices, etc. for generating the image data and the video data. Although described as cameras 120 herein, other implementations may include any types of sensors, such as light detection and ranging (LiDAR) systems, position sensors, proximity sensors, temperature sensors, and a variety of other non-contact sensors and sensor combinations for generating image data and video data of the robot 102 and the user 104 during the simulation.

The sensor apparatus 114 may include a microphone 122 that generates audio data as the sensor data. In this regard, the microphone 122 may be mounted on one of the cameras 120 in the simulation environment 110 for capturing audio data of the robot 102 and the user 104 during the simulation. While, as depicted, the sensor apparatus 114 includes the microphone 122 mounted on one of the cameras 120, the sensor apparatus 114 may include at least one microphone provided on each of the cameras 120, or otherwise include a plurality of microphones similar to the microphone 122 supported in the simulation environment 110 for capturing audio data of the robot 102 and the user 104 in multiple locations throughout the simulation environment 110 without departing from the scope of the present disclosure.

The robot 102 may include a robot arm 124 that contacts the user 104 during the simulation. The sensor apparatus 114 may include a robot sensor 130 mounted on the robot arm 124 for sensing the contact between the robot 102 and the user 104 during the simulation, and generating corresponding contact data as the sensor data. The robot sensor 130 may be a tactile sensor that generates tactile data as the contact data. The robot sensor 130 may be provided on any portion of the robot 102 configured to contact the user 104, including rigid and flexible portions of the robot 102 such as a hand portion 132, a wrist joint 134, a forearm connector 140, an elbow joint 142, and an upper arm connector 144 included in the robot arm 124.

In the depicted aspect, the robot arm 124 physically touches the user 104 when the robot 102 interacts with the user 104 in the simulation. According to another aspect, the robot 102 and the simulation environment 110 may be virtual, and the robot 102 performs a virtual interaction with the user 104 during the simulation. In this regard, the user 104 may be equipped with any combination of immersive virtual reality devices or wearable computing devices, including eyewear and haptic feedback devices for facilitating the simulation with the robot 102 in the simulation environment 110.

While, as depicted, the robot sensor 130 is a tactile sensor, the robot sensor 130 may include a combination of contact sensors for generating the contact data. In this regard, the robot sensor 130 may include other types of sensors, such as a capacitive touch sensor, a resistive touch sensor, an infrared touch sensor, a surface acoustic wave touch sensor, a strain gauge sensor, a piezoelectric sensor, a limit switch, a load cell, a pressure sensor, and a push button for generating the contact data without departing from the scope of the present disclosure.

The system 100 may include a computing device 150 that receives and processes the sensor data generated by the sensor apparatus 114, including the cameras 120, the microphone 122, and the robot sensor 130. The computing device 150 may determine a design characteristic and an implementation guideline of the robot 102 in the simulation, and augment a robot model 152 to incorporate the design characteristic and the implementation guideline using a machine learning algorithm. In this way, the computing device 150 may generate, augment, or update the robot model 152 and receive user input from the user 104 through a user interface 154.

In this regard, the user interface 154 may include a user interface camera 160 that generates image data and video data of the user 104 as part of the user input. The user interface 154 may include a user interface microphone 162 that generates audio data of the user 104 as part of the user input. The user interface 154 may include a keyboard 164 that generates text data by the user 104 as part of the user input. With this construction, the computing device 150 may receive any combination of text data, audio data, image data, and video data of the user 104 as user input through the user interface 154, in addition to the audio data, image data, and video data generated by the sensor apparatus 114 during the simulation. The user interface 154 may include a display 170 that displays the robot model 152 and/or one or more aspects or characteristics related to the robot model. The user interface may include a speaker 172 that communicates audio data to the user 104. The display 170 and the speaker 172 may each communicate a variety of information to the user 104 such as warnings or notifications indicative of a status of the simulation, and survey prompts for generating information of the user 104 associated with the simulation, described in greater detail herein.

Figure 2:
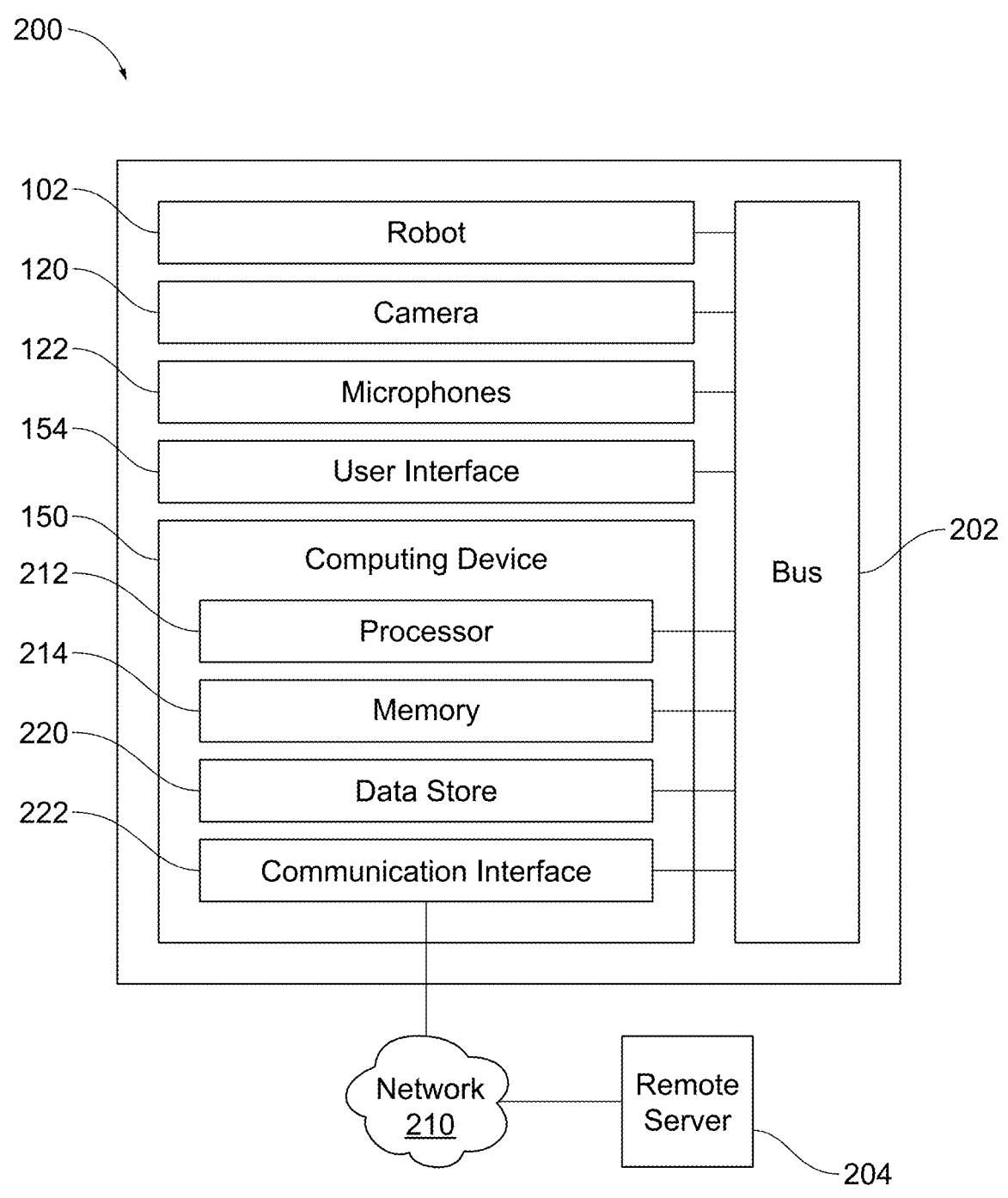
FIG. 2 is an exemplary operating environment of the system configured to carry out a computer-implemented method for performing the simulation, and determining a design characteristic or an implementation guideline of the robot based on the simulation.

FIG. 2 depicts an exemplary component diagram of an operating environment 200 of the system 100 including the robot 102, the sensor apparatus 114, the computing device 150, and the user interface 154. The robot 102, the sensor apparatus 114, the computing device 150, the user interface 154, and components thereof may be interconnected or operably connected by a bus 202, which facilitates computer communication therebetween. The components of the operating environment 200, as well as the components of other systems, hardware architectures, and software architectures discussed herein, may be combined, omitted, or organized into different architectures for various aspects.

The computing device 150 may be implemented as a part of the system 100 or another device, e.g., a remote server 204, connected via a network 210. The computing device 150 may be capable of providing wired or wireless computer communications utilizing various protocols to send and receive electronic signals internally to and from components of the operating environment 200. Additionally, the computing device 150 may be operably connected for internal computer communication via the bus 202 (e.g., a Controller Area Network (CAN) or a Local Interconnect Network (LIN) protocol bus) to facilitate data input and output between the computing device 150 and the components of the operating environment 200.

The computing device 150 may include a processor 212, a memory 214, a data store 220, and a communication interface 222, which may be each operably connected for computer communication via the bus 202. The communication interface 222 provides software and hardware to facilitate data input and output between the components of the computing device 150 and other components, networks, and data sources described herein.

Referring back to FIG. 1, the system 100 may determine the design characteristic and the implementation guideline of the robot 102 based on a multimodal signal generated by the sensor apparatus 114 and the user interface 154 and received by the computing device 150. The multimodal signal indicates an overall state of the robot 102 and the user 104 captured by the sensor apparatus 114 during the simulation, and a state of the user 104 outside the simulation. In this regard, the cameras 120, the microphone 122, the robot sensor 130, and the user interface 154 input different modalities to the computing device 150 as parts of the multimodal signal. The user interface camera 160, user interface microphone 162, and user interface keyboard 164 may each input different modalities to the computing device 150 as parts of the multimodal signal from the user interface 154.

The computing device 150 may generate discussion data indicative of user feedback from the simulation. More specifically, the computing device 150 generates the discussion data based on the audio data and the text data generated by the microphone 122 and the user interface 154.

The computing device 150 may generate form data associated with the user feedback from the simulation. In this regard, the computing device 150 may generate the form data as numerical rating values input by the user 104 and associated with the discussion data.

The computing device 150 combines the sensor data, the discussion data, and the form data in the multimodal signal, and develops the robot model 152 based on the multimodal signal using a machine learning algorithm. In this regard, the computing device 150 determines the design characteristic of the robot 102 based on the multimodal signal, and augments the robot model 152 to incorporate the design characteristic using the machine learning algorithm. The computing device 150 also determines the implementation guideline based on the multimodal signal, and augments a policy followed by the robot 102 to perform a task in the simulation.

According to one aspect, the machine learning algorithm may be a convolutional neural network (CNN) and may receive each modality of the multimodal signal along a single input layer for determining and augmenting the design characteristic and the implementation guideline. The machine learning algorithm may include a variety of neural network structures, including feedforward neural networks, recurrent neural networks, long short-term memory (LSTM) networks, regression algorithms, etc. for developing and augmenting the robot model 152. Furthermore, the machine learning algorithm may additionally incorporate regression algorithms, ensemble methods, gaussian processes Bayesian networks, support vector machines, dimensionality reduction techniques, physics-informed neural networks, reinforcement learning, and genetic algorithms without departing from the scope of the present disclosure. The design characteristic may be stored in the data store 220.

Methods for Operating the Information Generation System

Figure 3:
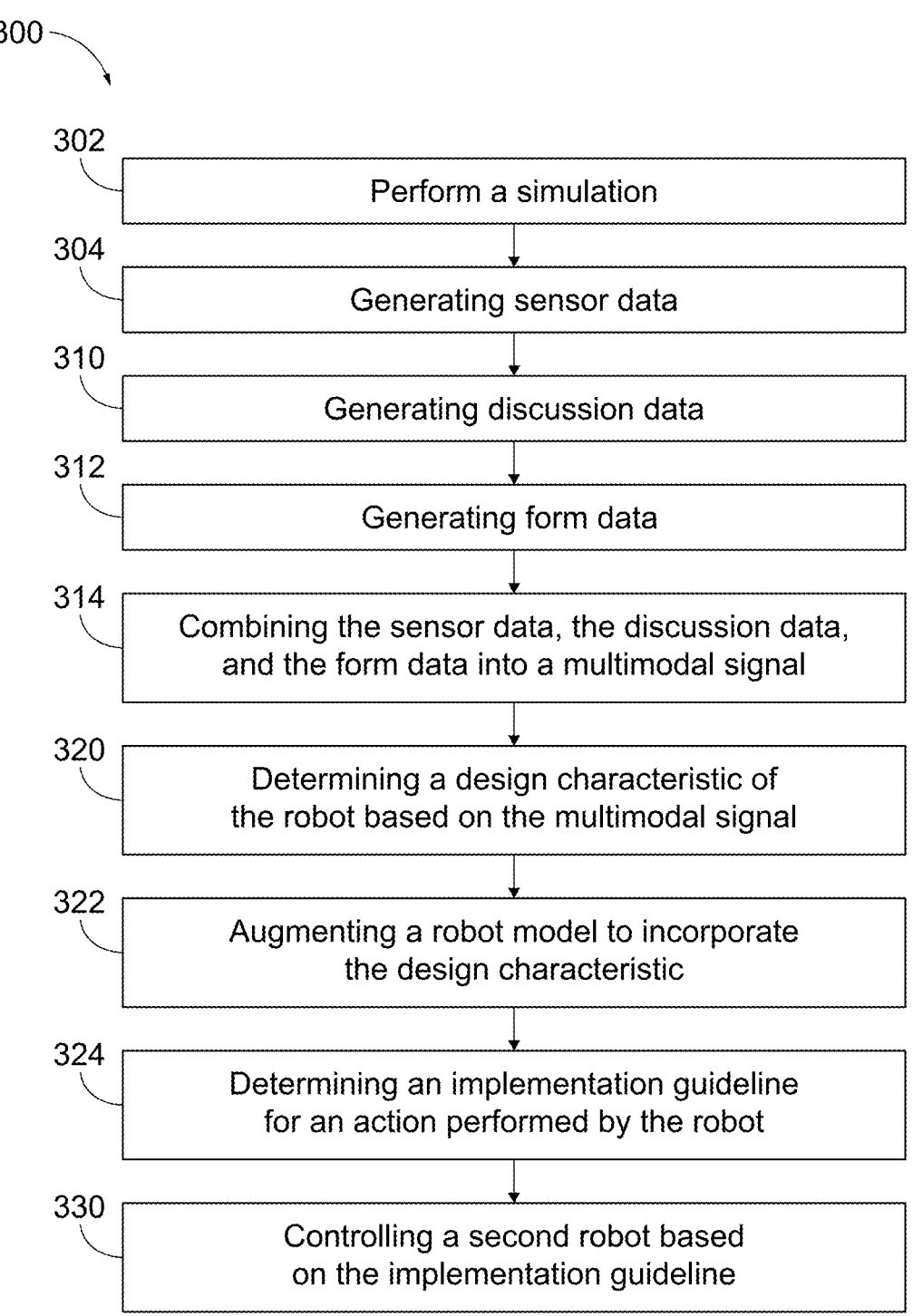
FIG. 3 is an exemplary computer-implemented method executed by the system of FIG. 1.

Referring to FIG. 3, a computer-implemented method of performing robotic simulation and design is described according to an exemplary aspect. FIG. 3 is described with reference to FIGS. 1 and 2. For simplicity, the computer-implemented method 300 is described as a sequence of blocks 302-330, but the elements of the computer-implemented method 300 may be organized into different architectures, elements, stages, and/or processes.

At block 302, the computer-implemented method 300 may include performing the simulation where the robot 102 interacts with the user 104. According to one aspect, the robot 102 may physically touch the user 104 when the robot 102 interacts with the user 104. According to another aspect, the robot 102 interacts with the user 104 virtually in the simulation environment 110.

At block 304, the computer-implemented method 300 may include the sensor apparatus 114 generating the sensor data indicative of the robot 102 interacting with the user 104 during the simulation. In this regard, generating the sensor data may include generating video data using at least two of the cameras 120 that are angularly offset from each other, where each of the at least two of the cameras 120 respectively capture the robot 102 and the user 104 in the simulation. With this construction, the computing device 150 receives more complete information regarding the positions and actions taken by the robot 102 and the user 104 during the simulation. More specifically, the computing device 150 may process the image data and the video data from the at least two of the cameras 120 to determine positions of the robot 102 and the user 104 in free space, and avoid conditions where portions of the robot 102 or the user 104 are entirely blocked from view in the image data and the video data.

Generating the sensor data at block 304 may also include generating audio data with the microphone 122 during the simulation. Generating the sensor data at block 304 may also include generating tactile data using the robot sensor 130 included in the robot 102.

At block 310, the computer-implemented method 300 may include generating the discussion data indicative of user feedback from the simulation. According to one aspect, generating the discussion data at block 310 may include transcribing the audio data into the discussion data, segmenting the discussion data into individual sentences or portions of individual sentences included in the user feedback, and assigning codes to the individual sentences or portions of individual sentences using the machine learning algorithm.

FIG. 4 depicts an exemplary code book 400 that is a database listing a plurality of codes 402 that may describe individual sentences or portions of individual sentences included in the user feedback. The codes 402 may be each assigned a unique identification (ID) number 404, and may be grouped into categories 410. The categories 410 may be respectively indicated as distinct shades of cells in the code book 400 containing the codes 402. The code book 400 may be at least initially predetermined, where the codes 402, the ID numbers 404, and the categories 410 may be received by the computing device 150 for application in a first iteration of the computer-implemented method 300.

With this construction, the assigned codes may be selected from a predetermined code book by the computing device 150 using the machine learning algorithm, and each assigned code 402 may be assigned to a plurality of individual sentences or portions of sentences in the user feedback. As such, each sentence or portion of a sentence in the user feedback shares a code 402 in common with at least one other sentence or portion of a sentence in the user feedback.

The computing device 150 may generate and assign a new code to one of the sentences or portions of sentences in the discussion data, and add the new code to the code book 400 using the machine learning algorithm. In this manner, the computing device 150 may augment the code book 400 to fully encompass the user feedback where the code book 400 initially lacks any codes which sufficiently indicate a sentence or portion of a sentence in the user feedback. The computing device 150 may reassign or revise the codes 402, and cluster the assigned codes into the categories 410. The categories 410 may include perception metrics by the user 104, robot parameters, touch phase by the robot 102, future trajectories of the robot 102, task and body variance by the robot 102, design characteristics, or methodology in the simulation.

At block 312, the computer-implemented method 300 may include generating form data associated with the user feedback from the simulation. In this regard, the computer-implemented method 300 may include the computing device 150 receiving a form prompt and communicating the form prompt through the user interface 154 to the user 104.

The form data may include a numeric value indicative of the user feedback associated with the form prompt. For example, where user feedback indicates a feeling of comfort with the robot 102 by the user 104 during the simulation, the form prompt may request a numbered rating with respect to the feeling of comfort experienced by the user 104. The computer-implemented method 300 may include receiving and displaying a discussion prompt to the user 104 with the user interface 154, the discussion prompt being associated with the form prompt in the multimodal signal. Continuing the example, the discussion prompt may request that the user 104 describe their feeling of comfort with the robot 102 during the simulation. As such, the discussion data of the user 104 may be generated in response to the discussion prompt, and associated with the form data through the form prompt.

With this construction, the computing device 150 may relate the discussion data to the form data in the multimodal signal with the machine learning algorithm for determining the design characteristic and implementation guideline of the robot 102. Further, numeric values from the form data may be treated as ground truth values to quantify and provide weight to the user feedback in the discussion data.

The form prompts may inquire about a variety of affect values experienced by the user 104 with respect to the robot 102 during the simulation. In this regard, for example, the form prompts may inquire about a gentleness or respectfulness of the robot 102 during the interaction, as experienced by the user 104. The form prompts may also inquire feelings of general relaxation, trust toward the robot 102, or satisfaction in execution touch by the robot 102 experienced by the user 104 during the simulation.

In this manner, the numeric value included in the form data may be an affect value experienced by the user 104, where the affect value indicates a feeling of comfort, relaxation, or trust with the robot, a gentleness of physical contact by the robot 102, a sense of respectfulness from the robot 102, a sense of satisfaction in performing the simulation with the robot 102, a softness of a material forming the robot 102, or other feelings experienced by the user 104 with respect to the robot 102 during the simulation. The affect value, and any other numeric values included in the form data, may be associated with the discussion data and the design characteristic of the robot 102 through the form prompts. In this regard, the form prompts may have predetermined associations with the discussion prompts, design features of the robot 102, and policy features for controlling the robot 102 as part of the multimodal signal.

The form prompts may also inquire about a variety of design impressions experienced by the user 104 with respect to the robot 102 during the simulation. In this regard, for example, the form prompts may inquire about a sense of softness of a material forming the robot 102, such as the hand portion 132 of the robot 102.

The form prompts may also inquire about a variety of task implementation impressions experienced by the user 104 with respect to the robot 102 during the simulation. In this regard, for example, the form prompts may inquire about a rating of how the robot 102 positioned portions of itself, such as the hand portion 132, while performing the task during the simulation.

Figures 5A, 5B:
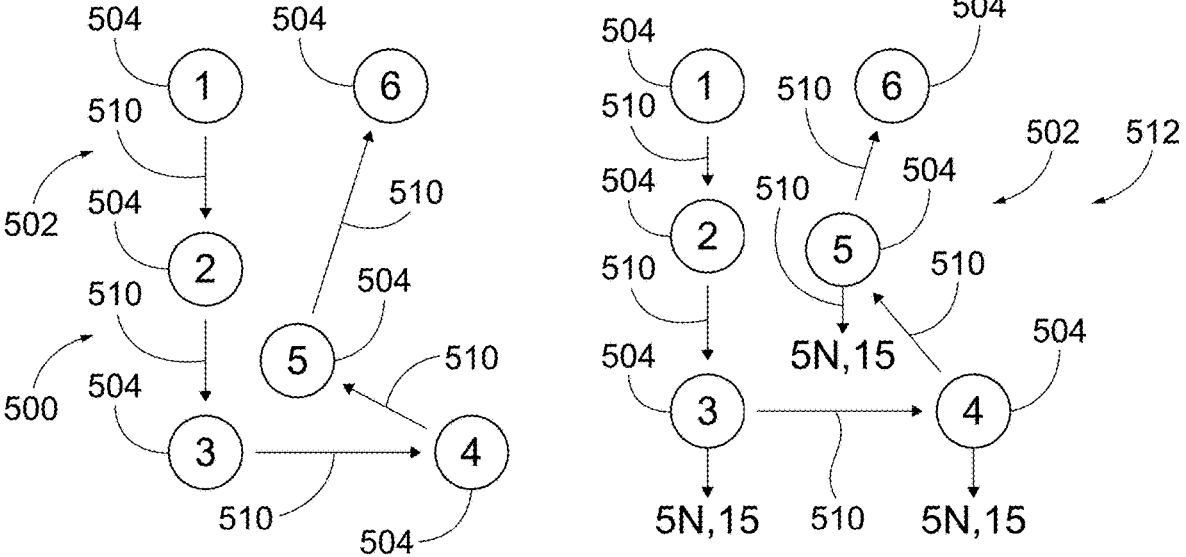
FIG. 5A is a first annotated drawing produced by the user, indicative of an intended trajectory for the robot in a first iteration of the simulation.
FIG. 5B is a second annotated drawing produced by the user, indicative of an intended trajectory for the robot in a second iteration of the simulation.

FIG. 5A depicts a first annotated drawing 500 produced by the user 104 prior to a first iteration of the simulation. The first annotated drawing 500 indicates a requested trajectory 502 taken by the robot 102 during the first iteration of the simulation for performing a task. The form prompts may inquire the first annotated drawing 500 from the user 104 prior to performing the task in the simulation. The computing device 150 may receive the first annotated drawing 500 via the user interface 154 as an electronic drawing, or receive the first annotated drawing 500 as a scanned document prepared by the user 104.

The requested trajectory 502 may include requested waypoints 504 that represent positions in free space to be occupied by the robot 102. The requested trajectory 502 may include requested vectors 510 connecting the requested waypoints 504. The requested vectors 510 may indicate a direction, speed, and amount of force taken by the robot 102 when traveling between consecutive requested waypoints 504 in the requested trajectory 502.

FIG. 5B depicts a second annotated drawing 512 produced by the user 104 after the first iteration of the simulation, and prior to a second iteration of the simulation. The computing device 150 may receive the second annotated drawing 512 via the user interface 154 as an electronic drawing, or receive the second annotated drawing 512 as a scanned document prepared by the user 104.

The second annotated drawing 512 may include the requested trajectory 502 by the user 104, augmented by the user 104 in view of the first iteration. In this regard, the user 104 may add, remove, or change any of the requested waypoints 504 and requested vectors 510 for performing the task in the second iteration of the simulation. As shown, the user 104 augmented the requested trajectory 502 by moving a fifth requested waypoint 504 farther from a third requested waypoint 504. The user 104 also augmented a force and a pause time of the robot 102 respectively by 5 Newtons and 15 tenths of a second at the third requested way point 504, a fourth requested waypoint 504, and the fifth requested waypoint 504.

The requested trajectory 502 of FIGS. 5A and 5B may be combined in the multimodal signal as part of the form data, where the computing device 150 determines the design characteristic and the implementation guideline for the robot 102 performing the task, using the machine learning algorithm. In this manner, the implementation guideline may describe aspects of an overall procedure, including a trajectory, as part of a policy for controlling the robot 102 or another robot with respect to a specific task and associated user.

The form prompts may also inquire, and the form data may include demographic information of the user 104. In this regard, for example, the form prompts may inquire from the user 104 aspects of gender, age, ethnicity, familiarity with robotics and associated technology, interest in robots as part of daily life, and initial sense of comfort or trust in being touched by a robot.

In aspects where the computer-implemented method 300 is performed iteratively, the form data may inquire about a sense of relative satisfaction, comfort, and proficiency with respect to the robot 102 between different iterations of the simulation. In this regard, for example, after the second iteration of the computer-implemented method 300, the form prompts may inquire the user 104 rating an experience of the second iteration relative to the first iteration.

Referring back to FIG. 3, at block 314, the computer-implemented method 300 may include combining the sensor data, the discussion data, and the form data in the multimodal signal. Combining the sensor data at block 314 may include combining the video data from the cameras 120, the audio data from the microphone 122, and the tactile data from the robot sensor 130 with the discussion data and the form data in the multimodal signal.

At block 320, the computer-implemented method 300 may include determining the design characteristic of the robot 102 based on the multimodal signal. More specifically, the computing device 150 determines the design characteristic of the robot 102 based on the multimodal signal produced at block 314 using the machine learning algorithm. The design characteristic may be a material property, a dimension, a color, or a shape of the robot 102.

The computing device 150 may determine a cross-theme connection between at least one of the assigned codes 402 and at least one of the categories 410 using the machine learning algorithm, and develop the design characteristic for the robot 102 at block 320 based on the cross-theme connection. The computing device 150 may determine the cross-theme connection based on a number of codes 402 in the at least one of the categories 410, an association of at least one of the assigned codes 402 with respect to a time in the simulation, an association of at least one of the categories 410 with respect to the time in the simulation, or an associated action taken by the robot 102 in the simulation.

The computing device 150 may generate a warning through the user interface 154, or disengage the robot 102 from the simulation when the sensor data, the discussion data, or the determined design characteristic exceeds a threshold value. With this construction, when the computing device 150 determines that the user 104 is experiencing stress outside an intended scope of the simulation, the simulation may be ended relatively quickly to avoid further excessive stress experienced by the user 104.

At block 322, the computer-implemented method 300 may include augmenting the robot model 152 to incorporate the design characteristic of the robot 102 using the machine learning algorithm. The computer-implemented method 300 may include manufacturing, fabricating, or programming a processor or controller of a second robot 514 (see FIG. 1) to implement the design characteristic based on the augmented robot model 152.

At block 324, the computer-implemented method 300 may include determining an implementation guideline for an action performed by the robot 102 in the simulation based on the multimodal signal using the machine learning algorithm. The implementation guideline may include a hand pose, a location of a trajectory waypoint, a speed of motion, and a force applied to the user 104 by the robot 102 in performing an assigned task.

At block 330, the computer-implemented method 300 may include augmenting a policy for controlling the robot 102 to incorporate the implementation guideline, using the machine learning algorithm. According to one aspect, the computing device 150 may develop the implementation guideline for the robot 102 based on the cross-theme connection determined at block 320.

The computer-implemented method 300 may be employed in an iterative process for augmenting the robot 102 and a policy for controlling the robot 102 based on user feedback associated with a simulation. In this regard, a second iteration of the computer-implemented method 300 may include augmenting the robot 102 to incorporate the design characteristic determined from the first iteration. The computer-implemented method 300 may also include manufacturing the second robot 514 to include the design characteristic determined from the first iteration, and controlling the second robot 514 based on the policy developed using the robot 102 in the simulation. The augmented robot 102 or the second robot 514 may be employed in additional simulations in the simulation environment 110, or deployed to real world application.

In the second iteration, the system 100 may perform a second simulation where the robot 102 interacts with the user 104 through the design characteristic. In this regard, the sensor apparatus 114 and the computing device 150 generate the sensor data indicative of the robot 102 and the user 104 during the second simulation, generate the discussion data indicative of the user feedback from the second simulation, and generate the form data associated with the user feedback from the second simulation.

The computing device 150 combines the sensor data, the discussion data, and the form data generated from the second simulation in the multimodal signal. The computing device 150 determines a second design characteristic and a second implementation guideline based on the multimodal signal using the machine learning algorithm. The computing device 150 augments the robot model 152 to incorporate the second design characteristic, and augments the policy to incorporate the second implementation guideline.

FIG. 6 depicts an exemplary iterative computer-implemented method incorporating the computer-implemented method 300 of FIG. 3. Referring to FIG. 6, a computer-implemented method of performing robotic simulation and design is described according to an exemplary aspect. FIG. 6 is described with reference to FIGS. 1-5. For simplicity, the computer-implemented method 600 is described as a sequence of blocks, but the elements of the computer-implemented method 600 may be organized into different architectures, elements, stages, and/or processes.

At block 602, the computer-implemented method 600 may include the robot 102 performing a first task in a first simulation. As depicted in FIG. 1, the first task may include the robot 102 wiping the user 104 with the object 112 for cleaning the user 104. Performing the first task at block 602 may include generating the sensor data and the discussion data indicative of the robot 102 and the user 104 during the first simulation.

Blocks 604-614 describe an iterative process of generating the form data and the discussion data through surveys answered by the user 104 after performing the first task in the first simulation at block 602. In this regard, the user interface 154 may generate the form prompts and the discussion prompts for the user 104 after the first task is performed, and collect the user feedback as the form data and the discussion data. Also, with this construction, the discussion data indicates user feedback made during the first simulation when the robot 102 interacts with the user 104, and indicates user feedback after the first simulation in response to the form prompts and the discussion prompts.

At block 604, the computer-implemented method 600 may include performing a first iteration of generating the form data corresponding to the first simulation. At block 610, the computer-implemented method 600 may include performing a first iteration of generating discussion data corresponding to the first simulation. At block 612, the computer-implemented method 600 may include performing a second iteration of generating the form data corresponding to the first simulation. At block 614, the computer-implemented method 600 may include performing a second iteration of generating discussion data corresponding to the first simulation. With this construction, blocks 604-614 provide alternating steps of generating the form data and the discussion data of the user 104 between performing the first task at block 602, and performing a second task at block 620.

Blocks 620-632 describe a second iteration of performing a task and generating the sensor data, the form data, and the discussion data similar to the first iteration described by blocks 602-614. In this regard, at block 620, the computer-implemented method 600 may include the robot 102 performing the second task in a second simulation. In the second simulation, the object 112 is medical gauze, and the second task may include pressing the medical gauze onto the user 104 and applying pressure so as to treat a hypothetical wound. Performing the second task at block 620 may include generating the sensor data and the discussion data indicative of the robot 102 and the user 104 during the second simulation.

Blocks 622-632 describe an iterative process of generating the form data and the discussion data through surveys answered by the user 104 after performing the second task in the second simulation at block 620. In this regard, the user interface 154 may generate the form prompts and the discussion prompts for the user 104 after the second task is performed, and collect the user feedback as the form data and the discussion data. Also, with this construction, the discussion data indicates user feedback made during the second simulation when the robot 102 interacts with the user 104, and indicates user feedback after the second simulation in response to the form prompts and the discussion prompts.

At block 622, the computer-implemented method 600 may include performing a first iteration of generating the form data corresponding to the second simulation. At block 624, the computer-implemented method 600 may include performing a first iteration of generating discussion data corresponding to the second simulation. At block 630, the computer-implemented method 600 may include a second iteration of generating the form data corresponding to the first simulation. At block 632, the computer-implemented method 600 may include performing a second iteration of generating discussion data corresponding to the first simulation. With this construction, blocks 622-632 provide alternating steps of generating the form data and the discussion data of the user 104 after performing the second task at block 620.

At block 634, the computer-implemented method 600 may include augmenting the robot model 152 to incorporate the design characteristic of the robot 102 determined from the sensor data, the form data, and the discussion data generated at blocks 602-632. In this regard, the computing device 150 combines the sensor data, the form data, and the discussion data generated at blocks 602-632 into the multimodal signal, and processes the multimodal signal with the machine learning algorithm to determine the design characteristic and the implementation guideline of the robot 102.

The computer-implemented method 600 may include augmenting the robot 102, or manufacturing the second robot 514 to include the design characteristic or perform the implementation guideline determined from blocks 602-634. The computer-implemented method 600 may include augmenting the policy for controlling the robot 102 or the second robot 514 to incorporate the implementation guideline.

The augmented robot 102 and the second robot 514 may be respectively employed in additional simulations, including further iterations of the computer-implemented method 300 or the computer-implemented method 600, for further developing the design characteristic and the implementation guideline, and for determining additional design characteristics and implementation guidelines associated with interacting with the user 104 to perform a task. The augmented robot 102 and the second robot 514 may also respectively be deployed for real world application, such as cleaning and pressing patient wounds.

Figure 7:
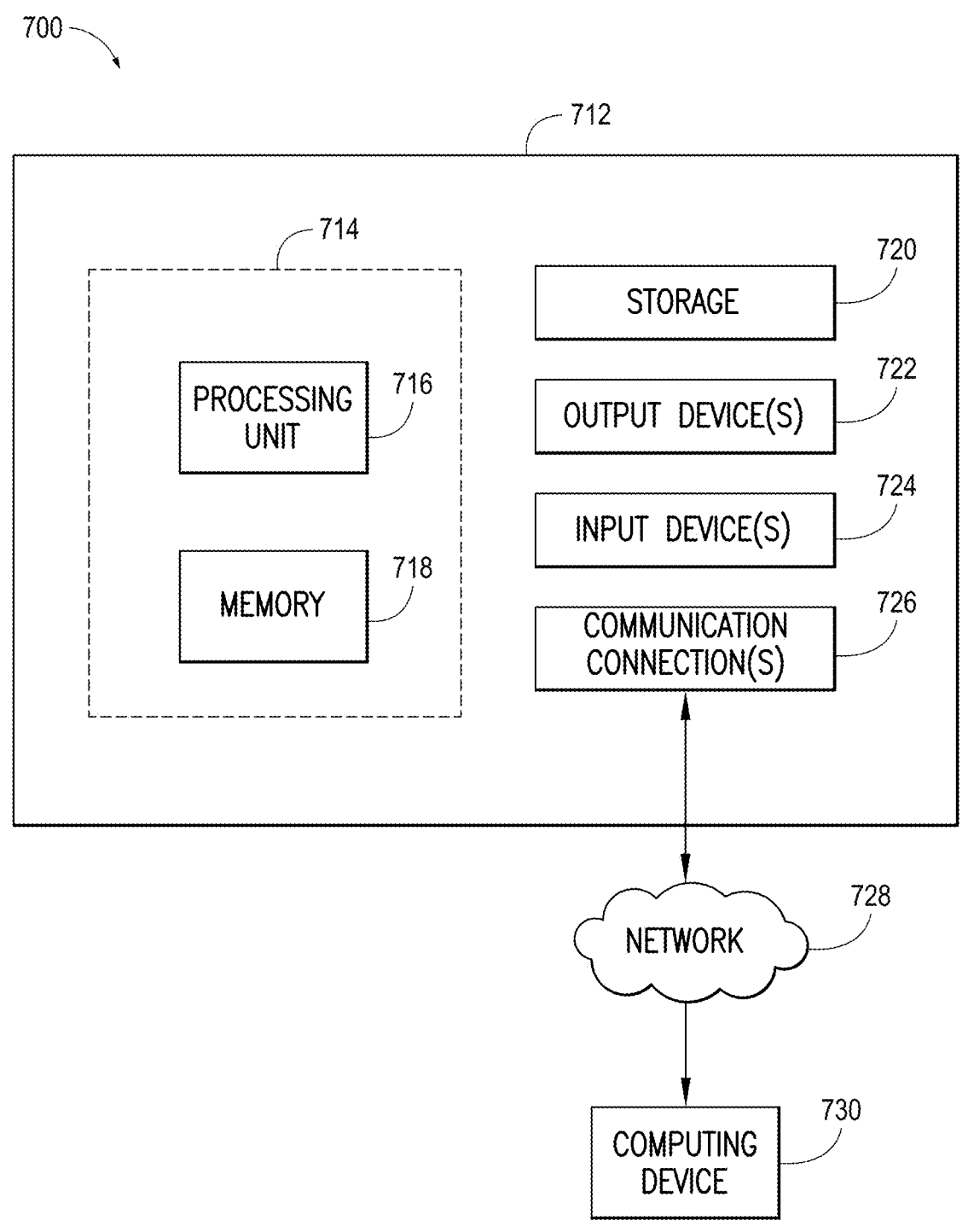
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini-computers, mainframe computers, distributed computing environments that include any of the above systems or devices, etc.

Generally, aspects are described in the general context of "computer readable instructions" being executed by one or more computing devices. Computer readable instructions may be distributed via computer readable media as discussed herein. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one aspect provided herein. In one configuration, the computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the computing device 712 includes additional features or functionality. For example, the computing device 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by the at least one processing unit 716, for example.

The term "computer readable media" as used herein includes computer storage media. Computer storage media includes volatile and nonvolatile, removable, and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 712. Any such computer storage media is part of the computing device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 712 includes input device(s) 724 such as keyboard, mouse, pen, voice input device, touch input device, infrared cameras, video input devices, or any other input device. Output device(s) 722 such as one or more displays, speakers, printers, or any other output device may be included with the computing device 712. Input device(s) 724 and output device(s) 722 may be connected to the computing device 712 via a wired connection, wireless connection, or any combination thereof. In one aspect, an input device or an output device from another computing device may be used as input device(s) 724 or output device(s) 722 for the computing device 712. The computing device 712 may include communication connection(s) 726 to facilitate communications with one or more other devices 730, such as through network 728, for example.

Figure 8:
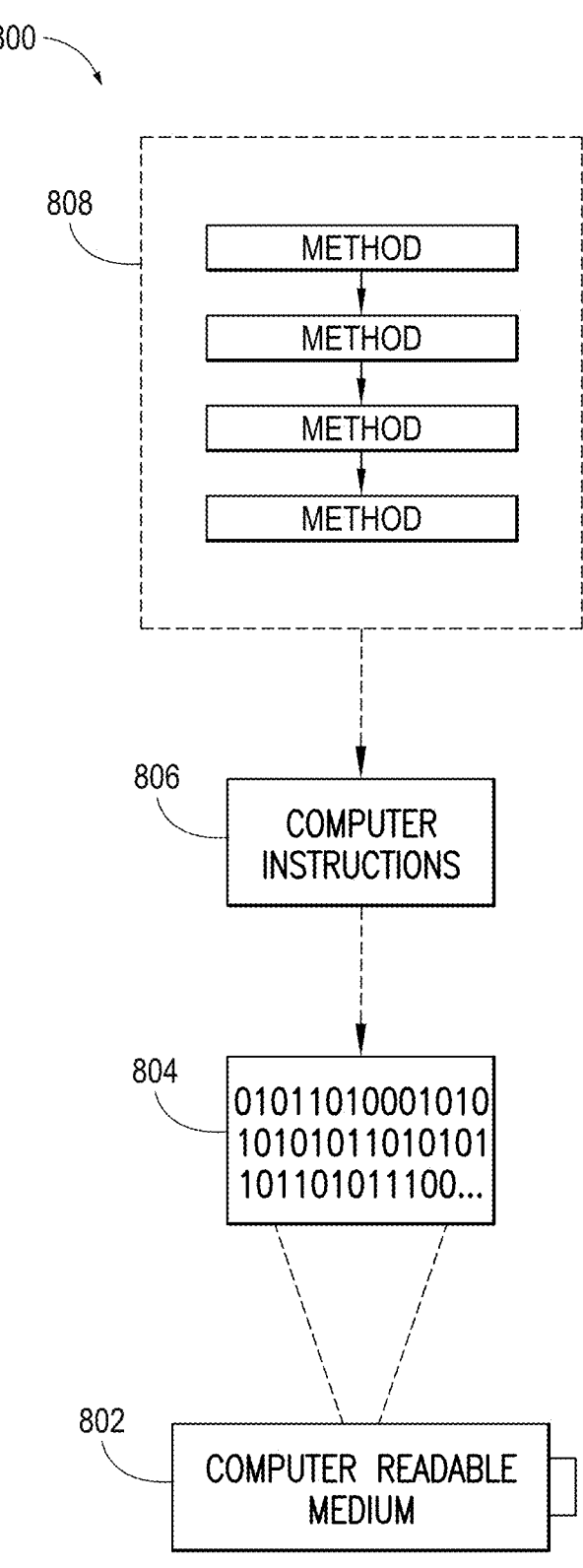
FIG. 8 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 8, wherein an implementation 800 includes a computer-readable medium 802, such as a CD-R, DVD-R, flash drive, a platter of a hard disk drive, etc., on which is encoded computer-readable data 804. This encoded computer-readable data 804, such as binary data including a plurality of zero's and one's as shown in 804, in turn includes a set of processor-executable computer instructions 806 configured to operate according to one or more of the principles set forth herein. In this implementation 800, the processor-executable computer instructions 806 may be configured to perform a method 808, such as the computer-implemented method 300 of FIG. 3 or the computer-implemented method 600 of FIG. 6. In another aspect, the processor-executable computer instructions 806 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations, or improvements therein may be subsequently made by those skilled in the art which are also intended to be encompassed by the following claims.

The invention claimed is:

1. A computer-implemented method of performing robotic simulation and design, comprising:
performing a simulation wherein a robot interacts with a user;
generating sensor data indicative of the robot interaction with the user during the simulation;
generating discussion data indicative of user feedback from the simulation;
generating form data associated with the user feedback from the simulation;
combining the sensor data, the discussion data, and the form data in a multimodal signal; and
determining a design characteristic of the robot based on the multimodal signal, and augmenting a robot model to incorporate the design characteristic using a machine learning algorithm.

2. The computer-implemented method of claim 1, comprising:
augmenting the robot to incorporate the design characteristic;
performing a second simulation wherein the robot interacts with the user through the design characteristic;
generating the sensor data indicative of the robot and the user during the second simulation;
generating the discussion data indicative of the user feedback from the second simulation;
generating the form data associated with the user feedback from the second simulation;
combining the sensor data, the discussion data, and the form data generated from the second simulation in the multimodal signal;
determining a second design characteristic based on the multimodal signal using the machine learning algorithm; and
augmenting the robot model to incorporate the second design characteristic.

3. The computer-implemented method of claim 1, wherein the robot physically touches the user when the robot interacts with the user.

4. The computer-implemented method of claim 3, wherein generating the sensor data includes generating tactile data using a tactile sensor included in the robot, and combining the sensor data includes combining the tactile data with the discussion data and the form data in the multimodal signal.

5. The computer-implemented method of claim 1, comprising:

receiving a form prompt, wherein the form data includes a numeric value indicative of the user feedback associated with the form prompt; and receiving a discussion prompt that is associated with the form prompt, and wherein the discussion data is generated in response to the discussion prompt.

6. The computer-implemented method of claim 5, wherein the numeric value is an affect value experienced by the user, the affect value indicates a feeling of comfort, relaxation, or trust with the robot, a gentleness of physical contact by the robot, a sense of respectfulness from the robot, a sense of satisfaction in performing the simulation with the robot, or a softness of a material forming the robot, and the affect value is associated with the design characteristic of the robot through the form prompts.

7. The computer-implemented method of claim 1, wherein generating the discussion data includes assigning codes to individual sentences or portions of individual sentences included in the user feedback, the assigned codes are selected from a predetermined code book, and each assigned code is assigned to a plurality of individual sentences or portions of sentences in the user feedback.

8. The computer-implemented method of claim 7, comprising generating and assigning a new code to one of the sentences or portions of sentences in the discussion data, and adding the new code to the predetermined code book using the machine learning algorithm.

9. The computer-implemented method of claim 7, comprising clustering the assigned codes into categories including perception metrics by the user, robot parameters, touch phase by the robot, future trajectories of the robot, task and body variance by the robot, design characteristics, or methodology in the simulation.

10. The computer-implemented method of claim 9, comprising determining a cross-theme connection between at least one of the assigned codes and at least one of the categories, and developing the design characteristic or an implementation guideline for the robot based on the cross-theme connection.

11. The computer-implemented method of claim 10, wherein the cross-theme connection is determined based on a number of codes in the at least one of the categories, an association of the at least one of the assigned codes with respect to a time in the simulation, an association of the at least one of the categories with respect to the time in the simulation, or an action by the robot in the simulation.

12. The computer-implemented method of claim 1, wherein the discussion data indicates user feedback made during the simulation when the robot interacts with the user, and indicates user feedback after the simulation in response to discussion prompts.

13. The computer-implemented method of claim 1, wherein generating the sensor data includes generating video data using at least two cameras that are angularly offset from each other, each of the at least two cameras respectively capturing the robot and the user in the simulation, and combining the sensor data includes combining the video data with the discussion data and the form data in the multimodal signal.

14. The computer-implemented method of claim 13, wherein generating the sensor data includes generating audio data with at least one microphone during the simulation, and generating the discussion data includes transcribing the audio data into the discussion data, the audio data being segmented into individual sentences or portions of individual sentences.

15. The computer-implemented method of claim 1, comprising generating a warning or disengaging the robot from the simulation when the sensor data, the discussion data, or the design characteristic exceeds a threshold value.

16. The computer-implemented method of claim 1, wherein the design characteristic is a material property, a dimension, a color, or a shape of the robot, the computer-implemented method comprising determining an implementation guideline for an action performed by the robot in the simulation based on the multimodal signal using the machine learning algorithm, and the implementation guideline includes a hand pose, a location of a trajectory waypoint, a speed of motion, and a force applied to the user by the robot.

17. The computer-implemented method of claim 16, comprising manufacturing a second robot including the design characteristic, and controlling the second robot based on the implementation guideline.

18. A system for performing robotic simulation and design, the system comprising:

a robot that interacts with a user in a simulation;

a sensor apparatus that generates sensor data indicative of the robot interaction with the user during the simulation; and at least one processor that:

generates discussion data indicative of user feedback from the simulation;

generates form data associated with the user feedback from the simulation;

combines the sensor data, the discussion data, and the form data in a multimodal signal; and determines a design characteristic of the robot based on the multimodal signal, and augments a robot model to incorporate the design characteristic using a machine learning algorithm.

19. The system of claim 18, wherein the robot includes a robot arm that physically touches the user when the robot interacts with the user in the simulation, the sensor apparatus includes a tactile sensor on the robot arm, wherein the tactile sensor generates tactile data as the sensor data, the sensor apparatus includes a microphone that generates audio data as the sensor data, the sensor apparatus includes at least two cameras that each generate video data as the sensor data, wherein the at least two cameras are angularly offset from each other, and the at least one processor combines the tactile data, the audio data, and the video data with the discussion data and the form data in the multimodal signal.

20. A non-transitory computer readable storage medium storing instructions that, when executed by a computer having a processor, causes the processor to perform a computer-implemented method, comprising:

performing a simulation wherein a robot interacts with a user;

generating sensor data indicative of the robot interaction with the user during the simulation;

generating discussion data indicative of user feedback from the simulation;

generating form data associated with the user feedback from the simulation;

combining the sensor data, the discussion data, and the form data in a multimodal signal; and determining a design characteristic of the robot based on the multimodal signal, and augmenting a robot model to incorporate the design characteristic using a machine learning algorithm.

* * * * *